(12) United States Patent
Skvorecz

(10) Patent No.: US 9,414,712 B2
(45) Date of Patent: Aug. 16, 2016

(54) COMPACTLY STACKABLE WIRE CHAFING STAND

(71) Applicant: Robert Skvorecz, Kinnelon, NJ (US)

(72) Inventor: Robert Skvorecz, Kinnelon, NJ (US)

( * ) Notice: Subject to any disclaimer, the term of this patent is extended or adjusted under 35 U.S.C. 154(b) by 116 days.

(21) Appl. No.: 14/535,811

(22) Filed: Nov. 7, 2014

(65) Prior Publication Data
US 2016/0128509 A1     May 12, 2016

(51) Int. Cl.
*F24C 3/08*     (2006.01)
*A47J 36/24*     (2006.01)
*A47J 47/16*     (2006.01)
*A47J 47/14*     (2006.01)

(52) U.S. Cl.
CPC .............. *A47J 36/2405* (2013.01); *A47J 47/14* (2013.01); *A47J 47/16* (2013.01)

(58) Field of Classification Search
CPC ......... B65D 7/20; B65D 21/046; A47J 47/16; A47J 47/14; A47J 36/24; A47J 36/2405; A47J 36/34
USPC .............. 248/153, 175, 163, 676, 146, 312.1, 248/311.2; 211/181.1; 206/502, 509; 126/40
See application file for complete search history.

(56) References Cited

U.S. PATENT DOCUMENTS

| | | | |
|---|---|---|---|
| 215,180 A | 5/1879 | Stiles | |
| 983,473 A | 2/1911 | Barnes | |
| 1,485,852 A | 3/1924 | Jarvis | |
| 1,688,846 A | 10/1928 | Andrews | |
| 1,947,932 A | 2/1934 | Fante | |
| 2,007,997 A | 7/1935 | Abernethy | |
| 2,110,726 A | 3/1938 | Harvey | |
| 2,190,065 A | 2/1940 | Griffin | |
| 2,269,425 A | 1/1942 | Bitney | |
| 2,673,053 A | 3/1954 | Kilian | |
| 2,739,466 A | 3/1956 | Maliniak | |
| D181,149 S | 10/1957 | Hoffstein | |
| 2,837,624 A | 6/1958 | Katzman et al. | |
| 2,838,198 A | 6/1958 | Vidal | |
| D189,469 S | 12/1960 | Fischer | |
| 2,979,242 A | 4/1961 | Van Huis et al. | |
| 3,160,308 A | 12/1964 | Hare et al. | |
| 3,276,733 A | 10/1966 | Rosser | |
| 3,305,125 A | 2/1967 | Chesley | |
| D213,899 S | 4/1969 | Rickmeier | |
| 3,650,384 A | 3/1972 | Pegg | |
| 3,848,748 A | 11/1974 | Ceccarelli | |
| 3,939,980 A | 2/1976 | King | |
| 3,939,981 A | 2/1976 | King | |
| 4,025,013 A | 5/1977 | Anantharaman | |
| 4,079,836 A | 3/1978 | Von Stein et al. | |
| 4,135,691 A | 1/1979 | Wiesmann | |
| 4,557,200 A | 12/1985 | Geschwender | |
| 4,718,402 A | 1/1988 | Fordyce | |

(Continued)

*Primary Examiner* — Todd M Epps
(74) *Attorney, Agent, or Firm* — Michael J. Feigin, Esq.; Feigin & Fridman

(57) ABSTRACT

A chafer wire stand has an upper rim of a closed rectangle and a lower rim of wire metal of similar, but smaller shape. The chafer stand is nestable such that angled wires extending between the upper and lower rim touch each other when nested and the upper rims of the nested stands are held close to each other. The upper and lower rims are connected by at least two wires substantially identically shaped and bent with each wire being unitary and having a segment thereof attached to the upper rim and extending outwardly therefrom to form a handle element for the chafer wire stand. Each wire is attached to the lower rim and extends therefrom to form two supporting legs for the chafer wire stand.

18 Claims, 10 Drawing Sheets

(56) References Cited

U.S. PATENT DOCUMENTS

| | | | | |
|---|---|---|---|---|
| 4,899,722 A | | 2/1990 | Horewitch | |
| 4,920,873 A | | 5/1990 | Stevens | |
| 5,065,735 A | | 11/1991 | Bourgeois et al. | |
| 5,282,458 A | | 2/1994 | Trimble | |
| 5,287,800 A | | 2/1994 | Orednick | |
| 5,301,909 A | | 4/1994 | Chang | |
| 5,503,062 A | | 4/1996 | Buff, IV | |
| 5,819,640 A | | 10/1998 | Cuomo | |
| D406,984 S | | 3/1999 | Skvorecz | |
| 5,921,513 A | * | 7/1999 | Skvorecz | B65D 7/20 126/40 |
| 5,996,948 A | | 12/1999 | Skvorecz | |
| 6,047,932 A | * | 4/2000 | Skvorecz | B65D 21/046 126/40 |
| 6,065,629 A | | 5/2000 | Sarnoff et al. | |
| 6,170,405 B1 | | 1/2001 | Weitzman et al. | |
| 6,213,005 B1 | | 4/2001 | Sherman et al. | |
| 6,234,068 B1 | | 5/2001 | Sherman | |
| 6,520,354 B1 | * | 2/2003 | Skvorecz | A47J 36/2477 211/181.1 |
| D485,706 S | | 1/2004 | O'Connell Cooper et al. | |
| 7,954,772 B2 | * | 6/2011 | Skvorecz | A47J 36/34 126/40 |
| RE42,988 E | * | 12/2011 | Skvorecz | B65D 21/046 126/40 |

* cited by examiner

COMPACTLY STACKABLE WIRE CHAFING STAND

FIELD OF THE DISCLOSED TECHNOLOGY

This invention relates to an economical, easily constructible wire chafing stand which is also very compactly nestable and stackable for compact storage and transportation.

BACKGROUND OF THE DISCLOSED TECHNOLOGY

Chafers and chaffing stands are used to hold pans, often with a heating device held below the pan. Catering establishments and restaurants often use such devices when keeping food warm at a location other than where the food was initially prepared. For example, chafers are used in places such as banquet halls, and the like where large amounts of food are constantly being directly served.

The chafers, usually in the form of rectangular metal receptacles are of a normally standard dimensional size and are filled with food to be heated and/or served. Chafers are commonly supported upon transportable wire stands during both heating and serving, with each of the wire stands being hereinafter referred to as a "wire chafing stand" and usually being composed of steel. The wire chafing stand of the prior art, as exemplified by U.S. Pat. No. 5,921,513, issued to Robert Skvorecz, is a relatively simple structure having an upper rim and a lower rim formed of respective larger and smaller rectangular wire structures around respective rectangular opening. The upper and lower rim are connected to each other by means of wire legs to form a frusto-pyramidical structure dimensioned to hold and support a chafer with contained food. The wire legs are usually welded to the upper and lower rims at the corners of the structure with the wire legs extending below the lower rim so that they also function as bottom supports to keep the stand level with the ground and to maintain the lower rim at a predetermined height above ground level for placement of chafing fuel heaters for the chafing dish in the stand.

Because numerous chafers are used at occasions, where required, numerous wire chafing stands are also required, with both the chafers and the wire chafing stands being respectively transported and stored and nested together in multiple units. Presently, wire chafing stands, such as those shown and described in the aforementioned patent permit the stands to be partially nested into one another when stacked i.e., the stands however nest only to a limited extent. As further described in said patent, the cost of storage and transportation has a direct relationship to the vertical height of a stack of nested wire stands. Accordingly, for wire stands with only limited nesting capability the transportation cost for transporting such wire stands over long distances becomes a significant factor in its selling price. This, in turn, reduces the ability to compete over large geographical areas where transportation cost and/or storage cost become too large.

In describing the wire stand structure of a chafer in the prior art patent, it was further noted therein that structures which permit nesting of multiple stands to reduce the vertical column height of a stack of nested stands, almost invariably entailed numerous shortcomings. These shortcoming include complicated wire stand designs which otherwise increase the cost of fabrication and cause the stand to be unwieldy, structurally as well as esthetically.

One particularly problem in the art is the difficulty of removal of wire stands from one another after nesting. Generally, if the wire stands are tightly nested they tend to wedge into one another and are then difficult to separate. The chafing stands must be readdily separable from one another thereby specifically excluding deep nesting from normal considerations of chafer wire stand construction.

There is therefore a need in the art to provide a wire chafing stand which has improved nesting ability, a decreased storage footprint, and which is simpler to manufacture and less expensive to procure.

SUMMARY OF THE DISCLOSED TECHNOLOGY

The present application is directed towards a wire stand for a chafer, or wire chafing stand, which, has deep nesting of multiple stands to minimize the size of stacked stands. This permits a stacked height of a plurality of such stands being less than half of that of the prior art without the prior art problems of complicated and expensive structure.

The chafer wire stand described herein comprises the standard chafer wire stand of an upper rim of wire metal which forms a closed substantially rectangular configuration, and a lower rim of wire metal having a rectangular geometry substantially identical to the upper rim (length to width ratio) but smaller. In an embodiment herein, the upper and lower rims are connected by at least two separate unitary wires substantially identically shaped and bent, with each wire having a segment thereof attached to the upper rim and extending outwardly therefrom to form a handle element for the chafer wire stand. Each wire is also attached to the lower rim and extends therefrom to form at least one supporting leg for the chafer wire stand. Furthermore the unitary wire also is configured to have at least two segments thereof extending between the upper rim and lower rims and connected thereto respectively to thereby hold the upper and lower rim in fixed position relative to each other. Each shaped and bent wire is substantially symmetrical relative to a vertical axis through the center thereof. Accordingly, and economically, the wire stand comprises the upper rim, the lower rim and two identical unitary shaped and bent wires.

In an embodiment of the wire stand for a chafer, two wires are configured to each form a cantilevered handle, two legs for support of the stand and chafer held thereby, and supporting interconnection segments between the upper and lower rectangular rims. The standard upper and lower rectangular rims are held together and supported by the two wires substantially identically shaped and with each being laterally symmetrical around a vertical axis perpendicularly located at the midpoints of an end side of either or both of the upper and lower rims. Each of the two wires is symmetrically shaped with a cantilevered wire handle element extending at substantially a right angle relative to the vertical axis. A single wired shape structure is thus economically usable in pairs to provide a member embodying handles, supporting legs and interconnecting elements between the upper and lower rims. The wires are angled and bent in integrally forming the handles, legs and rim interconnecting segments such that nesting of chafer wire stands, constructed with shaped wire pairs, is without wedging or impediment to separation of the nested chafer wire stands. All of the bend angles are either right angle or obtuse angles (greater than 90°) to enable direct-seated nesting, without wedging, in a minimal-height nesting configuration. In all embodiments, standard heater length and heater width wire elements interconnect respective opposite short end sides and long sides of the lower rim.

In another embodiment wherein said upper rim and lower rim are each of substantially rectangular configuration having respective short end sides and long sides, each wire comprises a segment which is attached to and extends between pairs of vertically adjacent long sides of the upper and lower rims on both long sides of the rectangular stand. Each wire further comprises two segments, which are attached to and extend between vertically adjacent short end sides of the upper and lower rims.

In a further embodiment, the segment which is attached to and extends between each of oppositely positioned vertically adjacent long sides of the upper and lower rims is straight. The two segments which are attached to and extend between vertically adjacent short end sides of the upper and lower rims are each symmetrically obtusely bent laterally with respect to each other and outwardly with respect to the upper and lower rims, whereby nesting of multiple chafer wire stands is without wedging between adjacently nested segments.

In a still further embodiment, the lower rim has four corners and each wire has two ends, with both ends of each wire being attached to the upper rim on opposite long sides thereof respectively. Both ends of the wire have wire extensions respectively extending at an obtuse angle to a vertically adjacent long side of the lower rim, which extend and are attached to respective positions of the lower rim, adjacent to and before a proximal corner. Each of the wire end extensions further extends downwardly therebeyond and are each bent and shaped to form respective lower leg supports at adjacent corners.

Attachment of respective upwardly bent segments of the wire end extensions to the lower rim are at positions beyond the adjacent corner on the short end side of the lower rim. The wire ends extensions extend upwardly thereafter to form the obtusely bent segments. These respective bent segments are attached to a short end side of the upper rim on symmetrically opposite proximal sides relative to the vertical axis. The wire end extensions extend laterally outwardly beyond the upper rim and meet as a unitary wire at the vertical axis with formation of the handle.

In another embodiment each wire comprises sixteen bends with eight bends symmetrically configured on each side of the vertical axis, with the eight bends comprising a first bend proximate to an end of the wire to facilitate attachment of the wire end to the upper rim. A second bend is at a first point of attachment to the lower rim. Third and fourth bends serve to configure a base of a leg support. A fifth bend is at an upward point of attachment of the leg support to the lower rim. A sixth obtuse outward and lateral bend is situated between the vertically adjacent lower and upper rims. A seventh bend is at a point of attachment to the upper rim to form an outwardly extending handle element; together with an eighth bend as part of the handle element on one side of the vertical axis.

In each embodiment herein, each wire is unitary and has two ends. Each wire is shaped and configured to be attached in pairs thereof to opposite sides of the vertically adjacent upper and lower rectangular rims with each unitary wire being mirror-image symmetrically bent on opposite sides of a perpendicular vertical axis. The vertical axis extends through a center of the unitary elongated wire when it is in a horizontal position extending along a longitudinal length thereof and through a center of a short end side of either or both the upper and lower rims when the wire is positioned thereon. The wire is symmetrically bent in multiple places along the longitudinal length thereof, with only obtuse angles of no less than 90°, on opposite sides of the vertical axis, to successively form in one embodiment, starting from one end of the wire a short lateral bend configured for attachment to a side of the upper rim.

Thereafter a first downwardly extending angled straight wire section is positioned towards a proximal vertically adjacent corner of the lower rim for attachment between an end thereof and the lower rim. A continued offset angular bend, out of a plane of the wire, beyond the second surface area of the lower rim, provides a first side of a first supporting leg. A bend lateral to the first side of the first supporting leg provides a supporting base for the first supporting leg. An upward bend towards a distal side of the vertically adjacent corner is used for attachment between an end thereof and the lower rim to provide a second side of the first supporting leg.

A further bend provides a first angled section of the wire in a direction away from the starting end toward a second end side of the upper rim with the first angled section being configured to be attached to the upper rim. The first angled section is bent at a central section thereof in a direction extending outwardly and laterally relative to the adjacent short end sides of the upper and lower rims. A lateral outward bend of the wire at the attachment between the first angled section and the upper rim at the bottom of the upper rim forms a first leg of a handle element. A further bend, configured to be parallel to the end side of the upper rim serves to form a first half of a gripping part of said handle at the vertical axis and a midpoint half of the elongated wire to the vertical axis. The symmetrical mirror image formation of another half of the wire, substantially or fully reversing the structure just described, provides, successively: a second half of the handle, a second angled section, a second supporting leg and a second angled straight wire section.

In embodiments, the chafer wire stand and each, any, or all of the various parts thereof, including bent and shaped wires, the first and second downwardly extending straight wire sections, the first and second supporting legs, and/or the first and second angled sections of successively vertically stacked chafer wire stands closely fit (within 1 cm) or touch (within 2 mm) the corresponding part (defined as "the same part, wire, or part of a wire of a substantially identical other chafer stand) on either or both of another chafer wire stand above and/or below for which the chafer wire stand is nested therewith.

The term "wedging" is defined as "two objects fixed into position requiring force in a measurable amount at least 10% greater than moving either object separately, excluding gravitational force acting on the object(s)."

The term "substantially" is defined as "considered to be so by one having ordinary skill in the art of household vacuums" and/or "at least 90% of the term being modified by 'substantially.'"

The term "generally" used herein is defined as a majority of the modified and described term following the word "generally."

The terms "or" and "and/or" should be interpreted as being inclusive of one or both terms being joined thereby. For example, in the set {A, B}, the phrase "A or B" includes "A," "B," and "A and B."

DETAILED DESCRIPTION OF EMBODIMENTS OF THE DISCLOSED TECHNOLOGY

Figure 1:
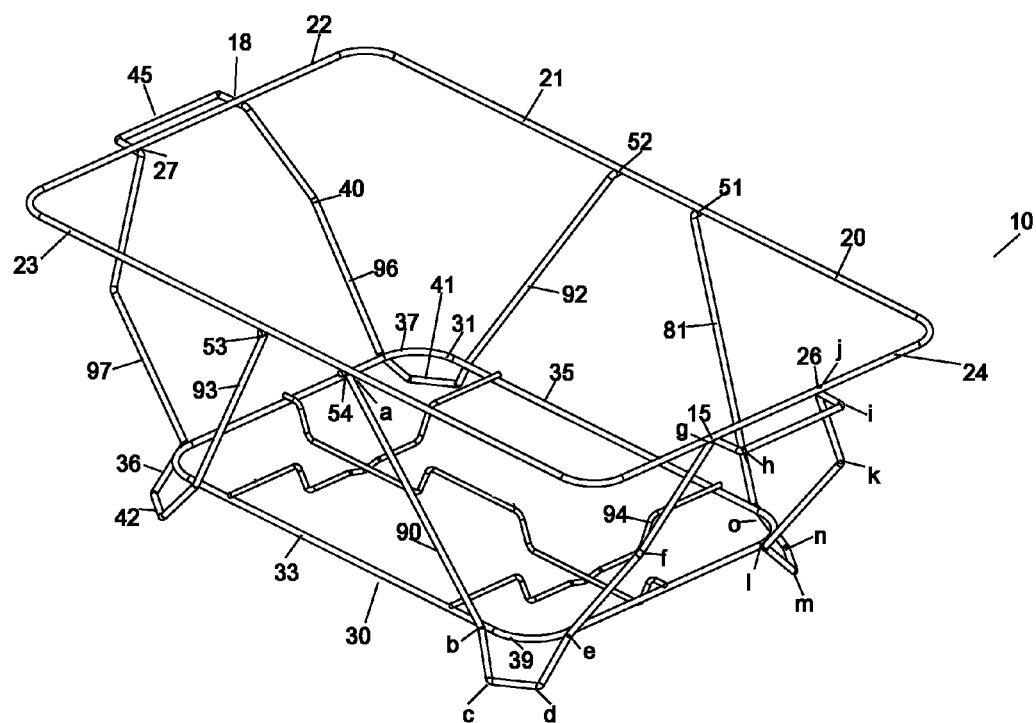
FIG. 1 is a top right side perspective view of the chafer wire stand herein.
Figure 2:
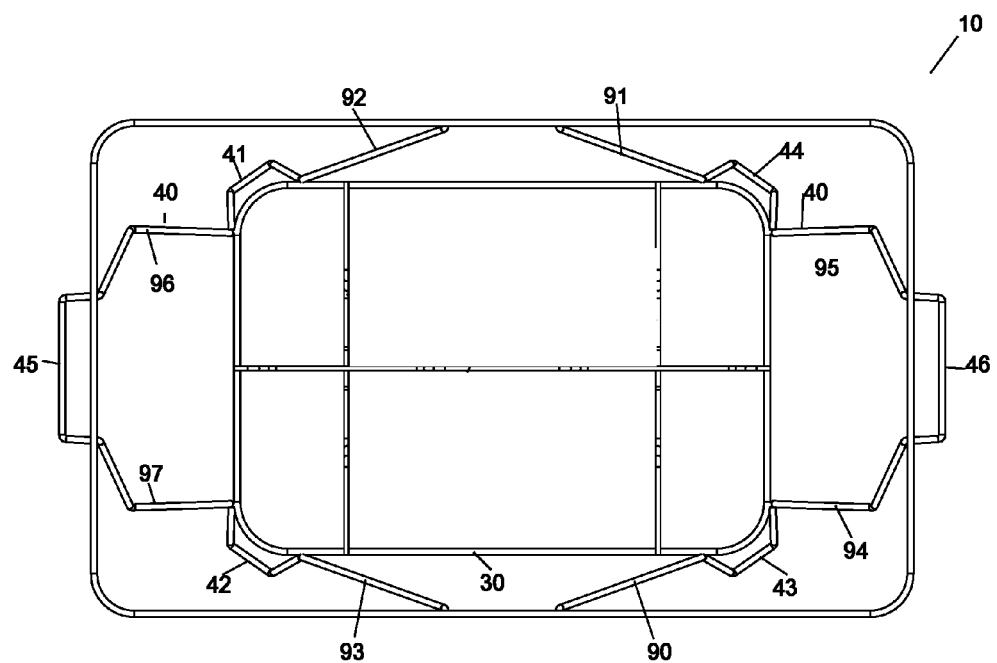
FIG. 2 is a top view of the chafer wire stand of FIG. 1.

For upper and lower rim interconnection, shaped handle elements of the two wires are welded to the lower side of the upper rectangular rim at two short side ends thereof. A section of the wire connects each of the wire handle element ends with the directly proximate short side end of the lower rectangular rim at a position proximate to but offset from a corner of the lower rim. The respective connecting sections are symmetrically outwardly and laterally bent relative to the vertical axis between the respective handle ends and the lower rim at the offset positions from the two positions proximate to the respective corners of the short side end of the lower rim.

The respective wires continue past the areas of connection (such as with welding) to the lower rim to form a supporting foot stand, generally of quadrilateral shape (a triangular shape is also possible if the wire is able to accommodate bending stress which eliminates one of the bends). An upwardly extending end of the respective legs is connected to the lower rim with a second segment continuing at an angle to the upper rim for connection thereto.

The two shaped wires are connected respectively, such as with welding to opposite sides, most commonly the short end sides of the upper and lower rims, with each wire having shaped ends thereof connected to opposite sides of the commonly long sides of the upper and lower rims.

When the chafer wire stands are stacked, the adjacent second segments of the chafer wire stands lie directly on each other. The first segments similarly nest with each other without any wedging therebetween as a result of the selected angle of bend. The right angled handles very closely fit adjacent each other with a simple lifting of the handles permitting easy separation between the nested chafer wire stands.

In an embodiment of the chafer wire stand, each wire is shaped with sixteen (16 or 15 with triangular legs) bends to integrally form the short side end handle, two supporting legs, and two pairs of interconnecting segments between upper and lower rims all of which are symmetrical with respect to a centrally positioned vertical axis. The ends of the wire are bent with a first and sixteenth bend to facilitate attachment to the upper rim.

With specific reference to the drawings, FIGS. 1-4 show a single chafer wire stand 10 of an embodiment herein, comprised of the standard rectangular wire rim 20 and the smaller lower rectangular wire rim 30 spaced apart and positioned relative to each in a standard chafer holding position. Identically dimensioned and shaped bent wires 40 and 40' are attached to the short end side pairs 22, 32 and 24, 34 of the rectangular upper and lower rims 20 and 30, to form respective handles 45 and 46 supporting leg pairs 41, 42 and 43, 44. Segment pairs 92, 93 and 90, 91 of wires 40 and 40' are straight segments which are attached to long sides 21, 23 and long sides 33, 34 of upper wire rim 20 and lower wire rim 30 respectively whereby they separate and hold upper and lower rims 20 and 30 in position with their respective long sides.

Outwardly and laterally obtusely bent wire segment pairs 96, 97 and 94, 95 of wires 40 and 40' are attached to short end sides 22, 24 and short end sides 32, 34 of upper wire rim 20 and lower wire rim 30 respectively whereby they separate and hold upper and lower rims 20 and 30 in position with their respective short end sides.

Bent wire segment pairs 41, 42 and 43, 44 extend below lower rim 30 at lower rim corners 36, 37 and 38, 39 and are outwardly bent, as shown, to form respective supporting legs. Bent wire segments 45 and 46 are attached to the short end sides 22 and 24 of upper rim 20 respectively, at points 27, 28 and 25, 26 and extend away from sides 22 and 24 at right angles thereto to form lifting handles 45 and 46 for the chafer wire stand 10.

Figure 3:
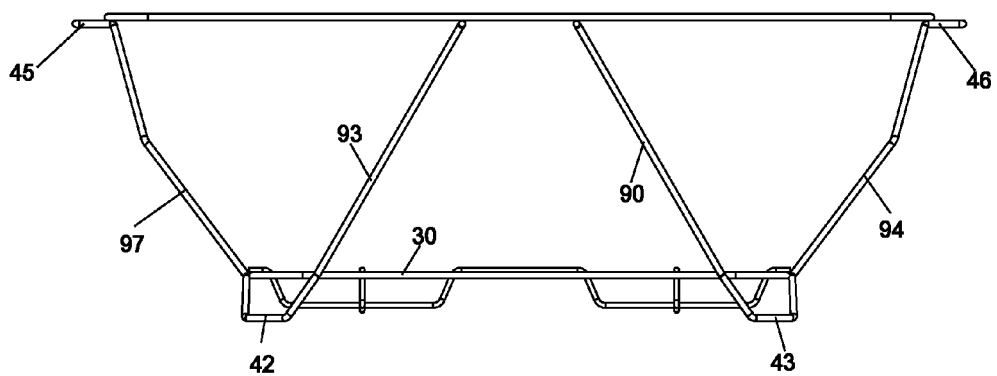
FIG. 3 is a long side view of the rectangular shaped chafer wire stand of FIG. 1 with views of both sides being identical.
Figure 4:
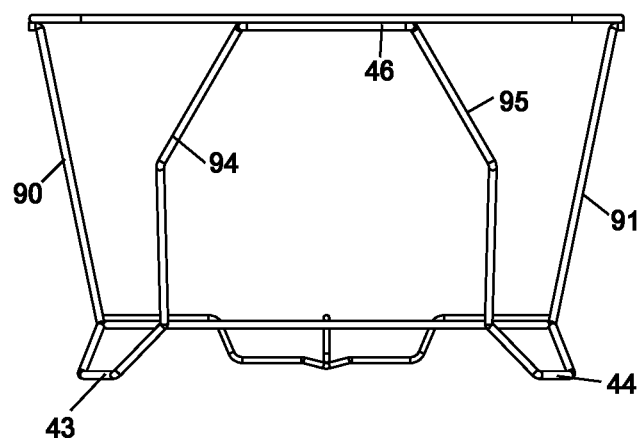
FIG. 4 is a short side end view of the rectangular shaped chafer wire stand of FIG. 1 with views of both short side end views being identical.
Figure 6:
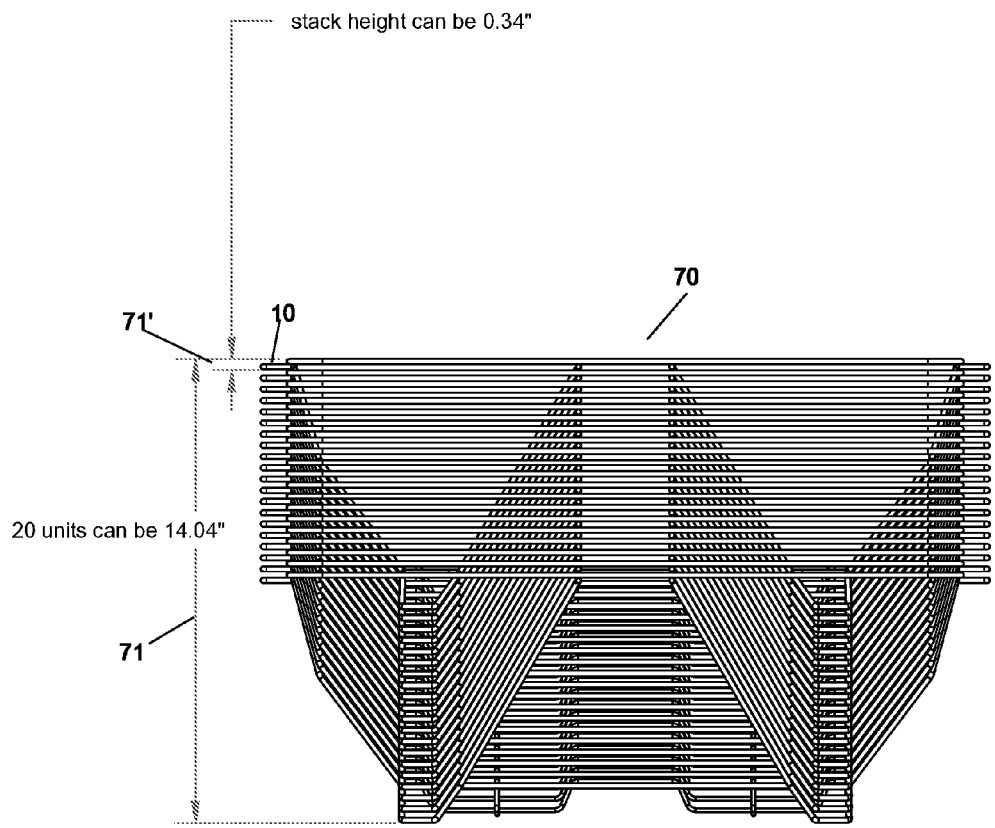
FIG. 6 is a long side view of 20 stacked chafer wire stands of the chafer wire stand of FIG. 1.
Figure 7:
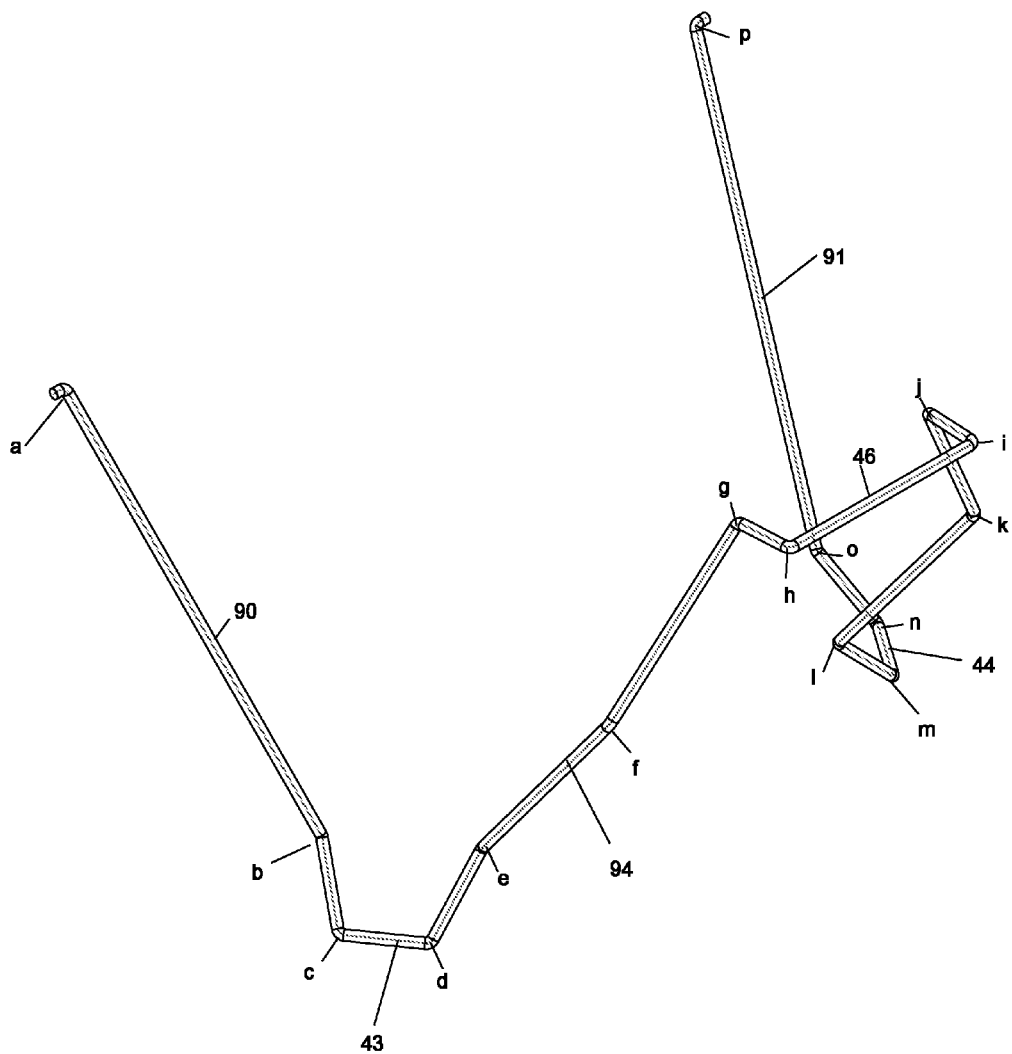
FIG. 7 is a right side perspective view of one of the shaped wires used in the chafer wire stand of FIG. 1 apart from connection with the upper and lower rectangular rims.
Figure 8:
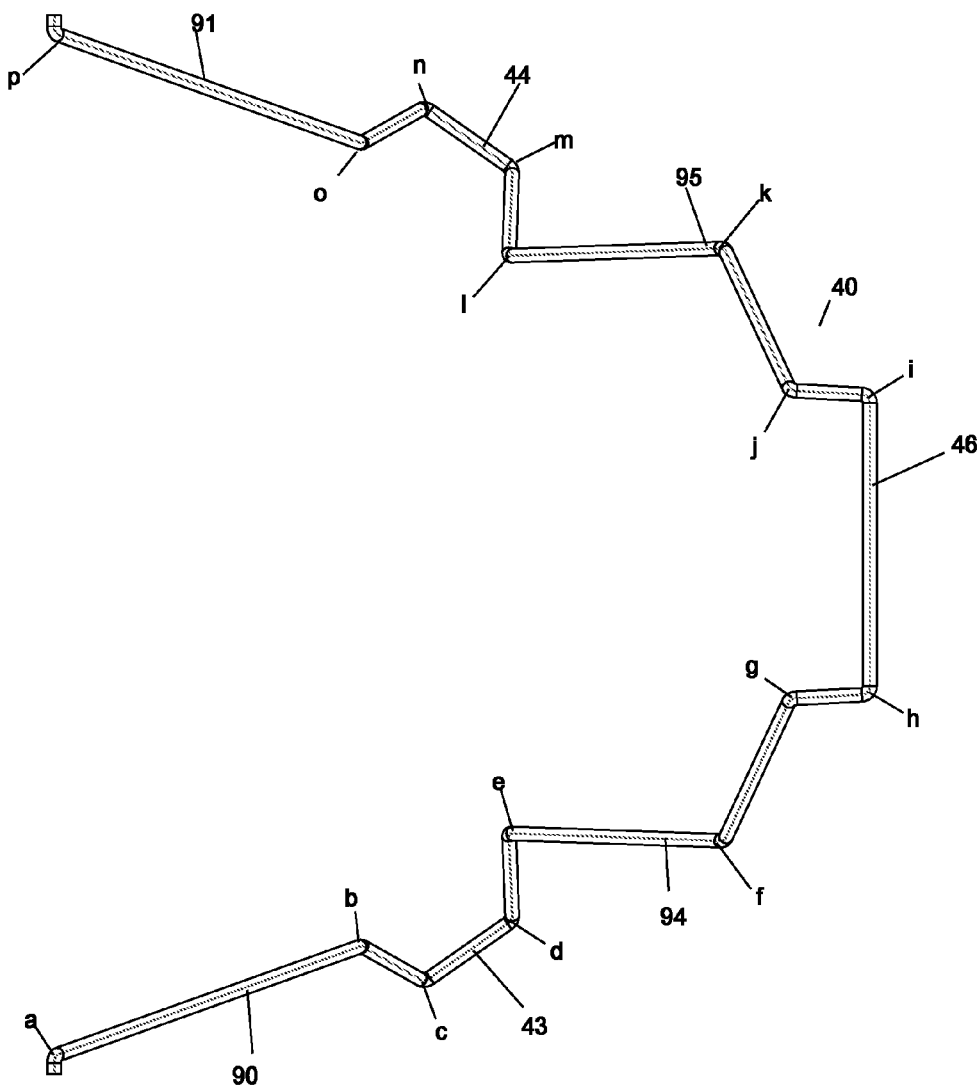
FIG. 8 is a top view of the shaped wire of FIG. 7.
Figure 9:
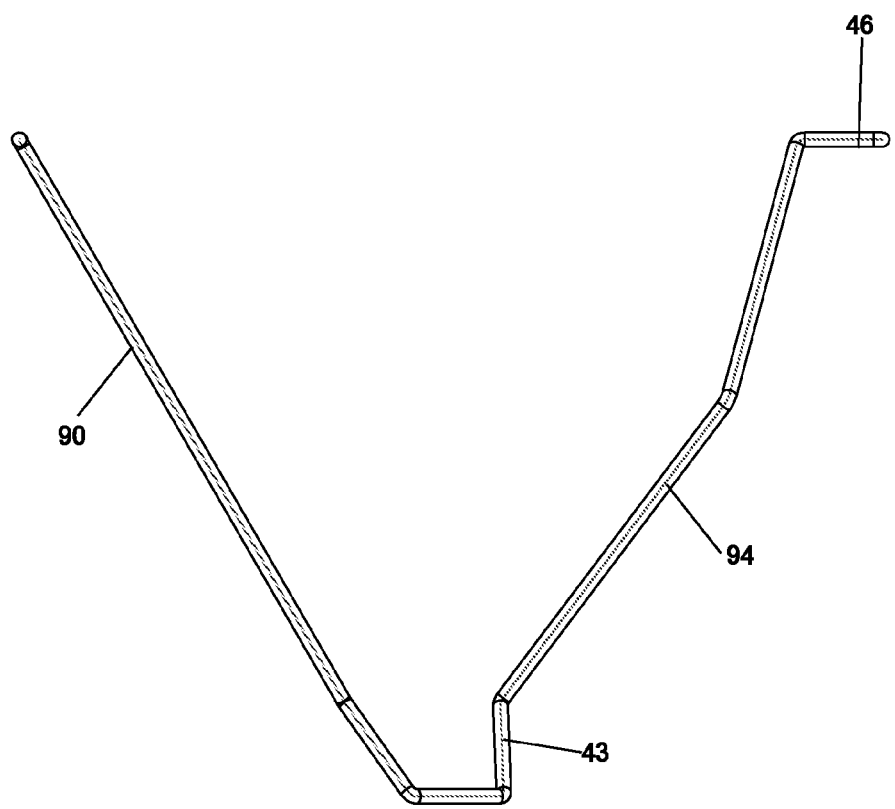
FIG. 9 is a left side view of the shaped wire of FIG. 7.
Figure 10:
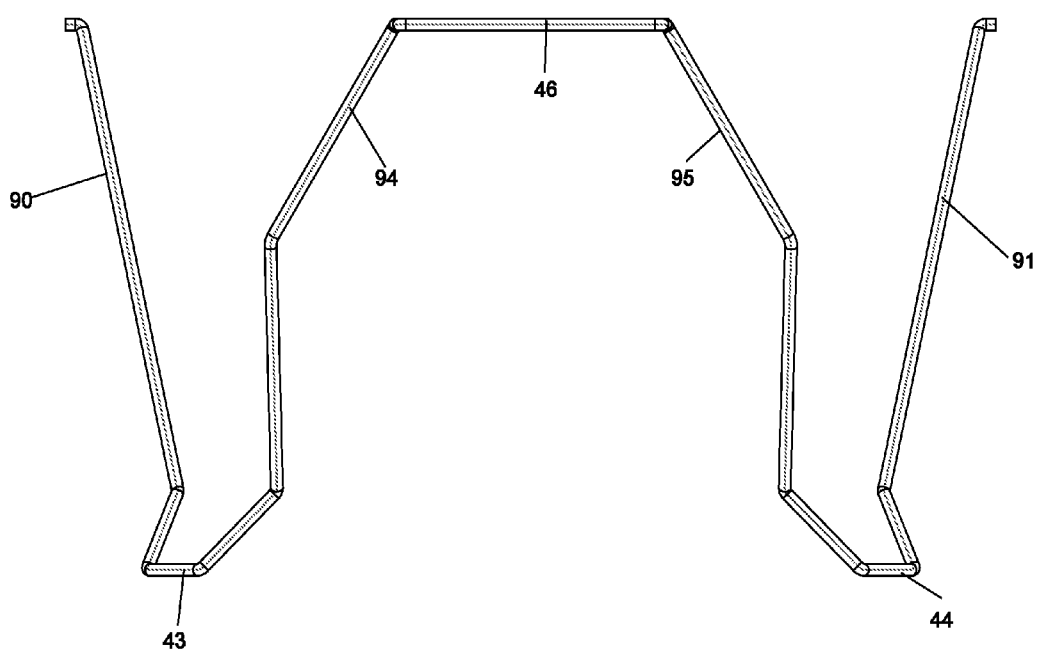
FIG. 10 is a right end view of the shaped wire of FIG. 7.

As shown in FIG. 1 and as more clearly seen in FIGS. 7 and 8, wire 40' (identical with wire 40) embodies bends a-p to provide the respective legs 43 and 44, handle 46 and supporting segment pairs 90, 91 and 94, 95 between the upper and lower rims 20 and 30. As seen in FIGS. 3 and 4 the bent wires 40 and 40' (and the connected upper and lower rims) are symmetrical with respect to the respective vertical axes V such that chafer wire stands 10 as shown in FIG. 6 can be readily nested regardless of end or side orientation.

Figure 5:
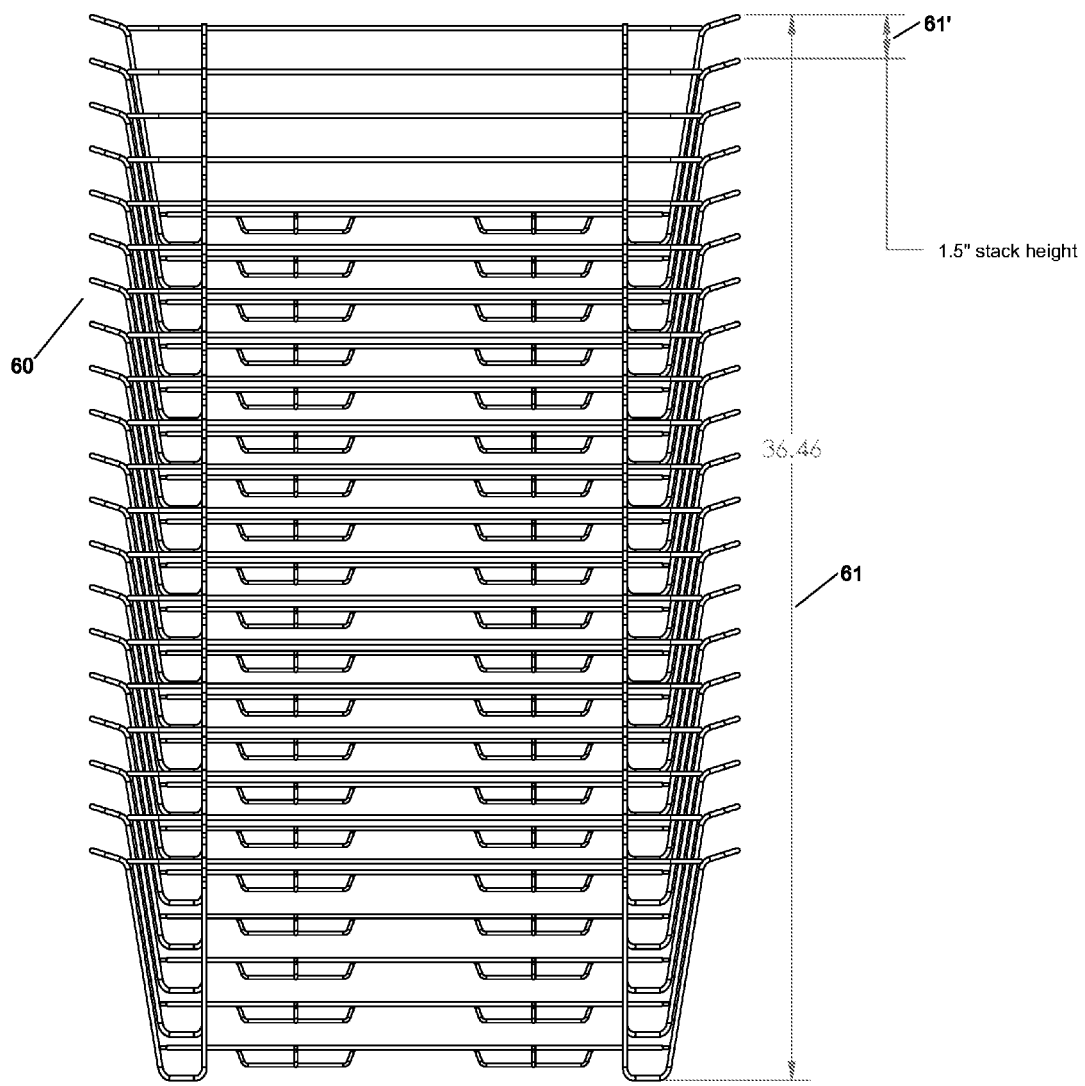
FIG. 5 is a long side view of 20 stacked chafer wire stands of the prior art.

FIG. 5 is a prior art depiction of the stacking of 20 chafer wire stands 1, as disclosed in the aforementioned patent, into stack 60. In comparison, the chafer wire stands 10 disclosed herein are shown similarly stacked in FIG. 6 in an identical stack of 20. The height of stack 60 is shown as height 61 with an individual stack height of 61'. Present nesting stack 70 has a stack height of 71 which is less than 40% that of prior art stack height 61 and with an individual stack height 61' less than 25% that of individual stack height 71' of the prior art. As is evident from FIG. 6, the various segments and elements of the interior bent wire arrangements of legs, handles, rim separation segments are closely arranged with the large obtuse bends of the wires providing for readily separable wire stands without wedging.

FIGS. 7 though 10 depict views of the shaped and bent wires of the embodiment described clearly evidencing the 90° or more of each of the angle bends, which provides the anti-wedging effect when the chafer wire stands are deeply nested.

As respectively shown in FIGS. 7 through 10 the shaped and bent wire 40' is unitary and being shaped and configured to be attached in pairs thereof to opposite sides of the vertically adjacent upper and lower rectangular rims 20 and 30 (in FIGS. 1-4). Each unitary wire is mirror-image symmetrically bent on opposite sides of a perpendicular vertical axis V extending through a center of the unitary elongated wire 40' in a horizontal position extending along a longitudinal length thereof. The wire is symmetrically bent in multiple places "a-p" along the longitudinal length thereof, with only obtuse angles of no less than 90°, on opposite sides of the vertical axis V to successively form, starting from one end, a short lateral bend "a" is configured for attachment thereof to a side of the upper rim 20. Extending therefrom is a first downwardly extending angled straight wire section 90 towards a proximal vertically adjacent corner 39 of a lower rim 30 for attachment between an end of section 90 and the lower rim 30. A continued off set angular bend "b" out of the plane of the wire provides a first side (b-c) of a first supporting leg 43. A bend "c" lateral to the first side of the first supporting leg 43 provides a supporting base c-d for the first supporting leg 43.

An upward bend "d" towards a distal side of the vertically adjacent corner 39 provides for attachment between the lower rim and a second side (d-e) of the first supporting leg 43. A further bend "e" provides a first angled section 94 in a direction away from the starting wire end and toward a second end side 24 of the upper rim 20 and configured to be attached thereto. The first angled section is bent at a central section thereof "f" downwardly and laterally outwardly. A lateral outward bend "g" from the configured attachment angled section 94 forms a first leg (g-h) of handle element 46. The wire is then bent at "h" with a bend configured to be parallel to the second end side 24 to form a first half of a gripping part of the handle 46 at the vertical axis V and a midpoint and half of the elongated wire 40'.

The symmetrical mirror image formation of the other half of the wire 40' from the wire midpoint at V and through bends i-p provides, successively: a second half of the handle, a second angled section, a second supporting leg and a second angled straight wire section.

The wires 40' are all identical and symmetrical around the vertical axis V and can thus be used on any side of the vertically stacked upper and lower rims 20 and 30, and are closely nestable without wedging, with legs, handles, and angled sections (straight and bent) being fitted close to each other as shown in FIG. 6 to provide a stacked structure of minimal size suitable for economical transport and use.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope.

Combinations of any of the methods, systems, and devices described herein above are also contemplated and within the scope of the invention.

I claim:

1. A chafer wire stand comprising:
   a) an upper rim of wire metal which forms a closed geometrical configuration circumscribing a first surface area,
   b) a lower rim of wire metal having a geometric shape substantially identical to said upper rim and circumscribing a second surface area with said first surface area being larger than said second surface area, and
   c) at least two wires of wire metal substantially identically shaped and bent with each wire having a segment thereof attached to said upper rim and extending outwardly therefrom to form a handle element for said chafer wire stand;
   and each wire being attached to said lower rim and extending downwardly therefrom to form at least one supporting leg for said chafer wire stand;
   wherein each wire has at least two segments thereof extending between said upper rim and lower rim and connected thereto respectively to thereby hold said upper and lower rims in fixed position relative to each other and wherein each wire is substantially symmetrical relative to a vertical axis through a center thereof.

2. At least two chafer wire stands of claim 1, wherein a first said chafer wire stand is nested on top of a second said chafer wire stand and said upper rim of said first chafer wire stand substantially touches said upper rim of said second chafer wire stand.

3. At least two chafer wire stands of claim 2, wherein at least four respective said segments of said first chafer stand touch at least four corresponding said segments of said second chafer stand when said first said chafer wire stand is nested on top of said second chafer wire stand.

4. The chafer wire stand of claim 1, wherein the segment of the wire attached to the upper rim to form the handle element is attached to the bottom of said upper rim.

5. The chafer wire stand of claim 1, wherein said at least one supporting leg is bent outwardly and extends out of a plane beyond said second surface area of said lower rim.

6. The chafer wire stand of claim 1, wherein said upper rim and lower rim are each of substantially rectangular configuration having respective short end sides and long sides wherein each wire comprises a segment which is attached to and extends between each of oppositely positioned vertically adjacent long sides of said upper and lower rims and wherein each wire comprises two segments which are attached to and extend between vertically adjacent short end sides of said upper and lower rims.

7. The chafer wire stand of claim 6, wherein said segment which is attached to and extends between each of oppositely positioned vertically adjacent long sides of said upper and lower rims are each straight and wherein said two segments which are attached to and extend between vertically adjacent short end sides of said upper and lower rims are each symmetrically obtusely bent laterally with respect to each other and outwardly with respect to said upper and lower rims, wherein nesting of multiple chafer wire stands is without wedging between adjacently nested segments.

8. The chafer wire stand of claim 7, wherein said lower rim has four corners and wherein each wire has two ends, with both ends of each wire being attached to said upper rim on opposite long sides thereof respectively and both ends of said wire having a wire extension respectively extending at an obtuse angle to a vertically adjacent long side of said lower rim and extending and being attached thereto at respective positions of said lower rim adjacent to and before a proximal corner, with each of said wire end extensions further extending downwardly there-beyond and bent and shaped to form respective lower leg supports at adjacent corners, with attachment of respective upwardly bent segments of said wire end extensions to said lower rim at positions beyond said adjacent corner on said short end side of said lower rim, with said wire ends extensions extending upwardly thereafter to form said obtusely bent segments, with said respective bent segments being attached to a short end side of said upper rim on symmetrically opposite proximal sides relative to said vertical axis and wherein said wire end extensions extend laterally outwardly beyond said upper rim and meet as a unitary wire at said vertical axis with said formation of said handle.

9. The chafer wire stand of claim 8, wherein each wire comprises sixteen bends with eight bends symmetrically configured on each side of said vertical axis, with said eight bends comprising:
   i) a first bend proximate to an end of said wire to facilitate attachment of said wire end to said upper rim;
   ii) a second bend at a first point of attachment to said lower rim;
   iii) third and fourth bends to configure a base of a leg support;
   iv) a fifth bend at an upward point of attachment of said leg support to said lower rim;
   v) a sixth obtuse outward and lateral bend between said vertically adjacent lower and upper rims;
   vi) a seventh bend at a point of attachment to said upper rim to form an outwardly extending handle element; and
   vii) an eighth bend as part of said handle element on one side of said vertical axis.

10. A chafer wire stand comprising:
   i. an upper rim of wire metal which forms a geometrical configuration circumscribing a first surface area,
   ii. a lower rim of wire metal having a substantially identical geometrical configuration relative to said upper rim and circumscribing a second area with said first area being larger than said second area, and iii. at least two wires of wire metal substantially identically shaped and bent with each wire having a segment thereof attached to said upper rim and extending outwardly therefrom to form a handle element for said chafer wire stand; and each wire being attached to said lower rim and extending downwardly therefrom to form at least one supporting leg for said chafer wire stand;

wherein each wire is unitary and has two ends, each wire being shaped and configured to be attached in pairs thereof to opposite sides of said vertically adjacent upper and lower rims, each unitary wire is mirror-image symmetrically bent on opposite sides of a perpendicular vertical axis extending through a center of said unitary elongated wire in a horizontal position extending along a longitudinal length thereof, said wire is symmetrically bent in multiple places along said longitudinal length thereof, with only obtuse angles of no less than 90°, on opposite sides of said vertical axis to successively form, starting from one end:

a) a short lateral bend attached to a side of said upper rim,
b) a first downwardly extending angled straight wire section towards a proximal vertically adjacent corner of a lower rim attaching between an end thereof and said lower rim,
c) a continued off set angular bend out of a plane of said wire providing a first side of a first supporting leg,
d) a bend lateral to said first side of said first supporting leg providing a supporting base for said first supporting leg,
e) an upward bend towards a distal side of said vertically adjacent corner for attachment between an end thereof and said lower rim providing a second side of said first supporting leg,
f) a bend providing a first angled section in a direction away from said one end toward a second end side of said upper rim configured attached thereto, with said first angled section being bent at a central section thereof downwardly and laterally outwardly, and further connected to a lateral outward bend which forms a first leg of a handle element, and,
g) a bend parallel to said second end side forming a first half of a gripping part of said handle at said vertical axis and a midpoint and half of said elongated wire, wherein said symmetrical mirror image formation of another half of said wire provides, successively: a second half of said handle, a second angled section, a second supporting leg and a second angled straight wire section.

11. The chafer wire stand of claim 10, wherein said segment of the wire attached to said upper rim to form the handle element is attached to a bottom of said upper rim.

12. The chafer wire stand of claim 10, wherein said at least one supporting leg is bent outwardly and extends out of a plane beyond said second surface area of the lower rim.

13. The chafer wire stand of claim 10, wherein said first and second downwardly extending straight wire sections, said first and second supporting legs, and said first and second angled sections of successively vertically stacked chafer wire stands are configured to respectively closely fit adjacent each other without wedging therebetween.

14. A nested stack of at least two chafer wire stands of claim 10:

wherein said wire stands nest with respective adjacent positioning of said angled segments; and wherein said angled segments are bent with an obtuse angle such that said angled segments of a first said chafer stand in said nested stack and a second said chafer stand in said nested stack touch each other when nested.

15. The nested stack of at least two chafer wire stands of claim 10, wherein said supporting legs are bent outwardly out of a plane of the lower rim at an angle matched to that of said straight segments and angled segments when nested.

16. The nested stack of at least two chafer wire stands of claim 8, wherein each handle extends perpendicularly outward from respective upper rim short side edges such that spacing between said stacked wire stands is substantially a thickness of said handles.

17. A shaped and configured structurally rigid but bendable unitary elongated wire of wire metal having two ends, said wire being shaped and configured to be attached in pairs thereof to opposite sides of vertically stacked upper and lower rectangular rims of a chafer wire stand, each unitary wire is mirror-image symmetrically bent on opposite sides of a perpendicular vertical axis extending through a center of said unitary elongated wire in a horizontal position extending along a longitudinal length thereof, said unitary elongated wire is symmetrically bent in multiple places along said longitudinal length thereof, with only obtuse angles of no less than 90°, on opposite sides of said vertical axis to successively form, starting from one end:

a. a short lateral bend configured for attachment thereof to a side of said upper rim,
b. a first downwardly extending angled straight wire section towards a proximal vertically adjacent corner of a lower rectangular rim for attachment between an end thereof and said lower rectangular rim,
c. a continued off set angular bend out of said plane of said wire to provide a first side of a first supporting leg,
d. a bend lateral to said first side of said first supporting leg to provide a supporting base for said first supporting leg,
e. an upward bend towards a distal side of said vertically adjacent corner for attachment between an end thereof and said lower rectangular rim to provide a second side of said first supporting leg,
f. a bend to provide a first angled section in a direction away from said one end toward a second end side of said upper rectangular configured to be attached thereto, with said first angled section being bent at a central section thereof downwardly and laterally outwardly, and further connected to a lateral outward bend which forms a first leg of a handle element, and,
g. a bend configured to be parallel to said second end side to form a first half of a gripping part of said handle at said vertical axis and a midpoint and half of said elongated wire, wherein a symmetrical mirror image formation of another half of said wire provides, successively: a second half of said handle, a second angled section, a second supporting leg and a second angled straight wire section.

18. The shaped and configured unitary elongated wire of claim 17, wherein said first and second downwardly extending straight wire sections, said first and second supporting legs, said first and second angled section of successively vertically stacked shaped and configured wires are configured to respectively closely fit adjacent each other without wedging therebetween.

* * * * *